US010560510B2

(12) United States Patent
Li et al.

(10) Patent No.: US 10,560,510 B2
(45) Date of Patent: Feb. 11, 2020

(54) APPLICATION CLASSIFICATION AND MANAGEMENT

(71) Applicant: CA, Inc., San Jose, CA (US)

(72) Inventors: Qing Li, Cupertino, CA (US); Min Hao Chen, Milpitas, CA (US); Haibiao Fan, Hayward, CA (US); Wenjing Wang, Sunnyvale, CA (US)

(73) Assignee: CA, Inc., San Jose, CA (US)

( * ) Notice: Subject to any disclaimer, the term of this patent is extended or adjusted under 35 U.S.C. 154(b) by 125 days.

(21) Appl. No.: 15/228,885

(22) Filed: Aug. 4, 2016

(65) Prior Publication Data

US 2018/0041376 A1    Feb. 8, 2018

(51) Int. Cl.
*H04L 29/08* (2006.01)
*H04L 29/06* (2006.01)
*H04L 12/911* (2013.01)

(52) U.S. Cl.
CPC ............ *H04L 67/02* (2013.01); *H04L 47/824* (2013.01); *H04L 69/22* (2013.01)

(58) Field of Classification Search
None
See application file for complete search history.

(56) References Cited

U.S. PATENT DOCUMENTS

| 2006/0094400 | A1* | 5/2006 | Beachem | H04L 63/101 |
| | | | | 455/410 |
| 2010/0248699 | A1* | 9/2010 | Dumais | H04L 67/1095 |
| | | | | 455/414.1 |
| 2011/0167474 | A1* | 7/2011 | Sinha | G06F 21/51 |
| | | | | 726/1 |
| 2013/0012161 | A1* | 1/2013 | Rubin | H04L 47/14 |
| | | | | 455/406 |
| 2013/0183951 | A1* | 7/2013 | Chien | H04W 4/50 |
| | | | | 455/418 |
| 2014/0273950 | A1 | 9/2014 | Li et al. | |
| 2015/0026330 | A1* | 1/2015 | Ahmed | G06F 21/73 |
| | | | | 709/224 |
| 2015/0295808 | A1* | 10/2015 | O'Malley | H04L 47/22 |
| | | | | 709/224 |
| 2015/0326615 | A1* | 11/2015 | Sinha | H04W 12/08 |
| | | | | 726/1 |

(Continued)

*Primary Examiner* — Sargon N Nano
*Assistant Examiner* — Christopher B Robinson
(74) *Attorney, Agent, or Firm* — Maschoff Brennan

(57) ABSTRACT

In certain embodiments, a network edge device comprises a memory storage, a networking component configured to communicate with a mobile device and a database comprising application attributes, and a processor. The processor, in certain embodiments, is located within the network edge device and is operable to receive application traffic from the mobile device (the application traffic being associated with an application), classify the application traffic by associating the application traffic with an application ID, and send a query comprising the application ID to the database comprising application attributes. In addition, the processor, in certain embodiments, is operable to receive a response, from the database comprising application attributes, comprising one or more application attributes associated with the application, wherein the response is based in part on the application ID, and to enforce a policy based in part on the application attribute.

16 Claims, 5 Drawing Sheets

(56) References Cited

U.S. PATENT DOCUMENTS

2016/0021199 A1* 1/2016 Krimon .................. H04L 67/18
709/225
2016/0099963 A1* 4/2016 Mahaffey ............ H04L 63/0227
726/25
2016/0112269 A1* 4/2016 Singh .................. H04L 41/0853
709/224

* cited by examiner

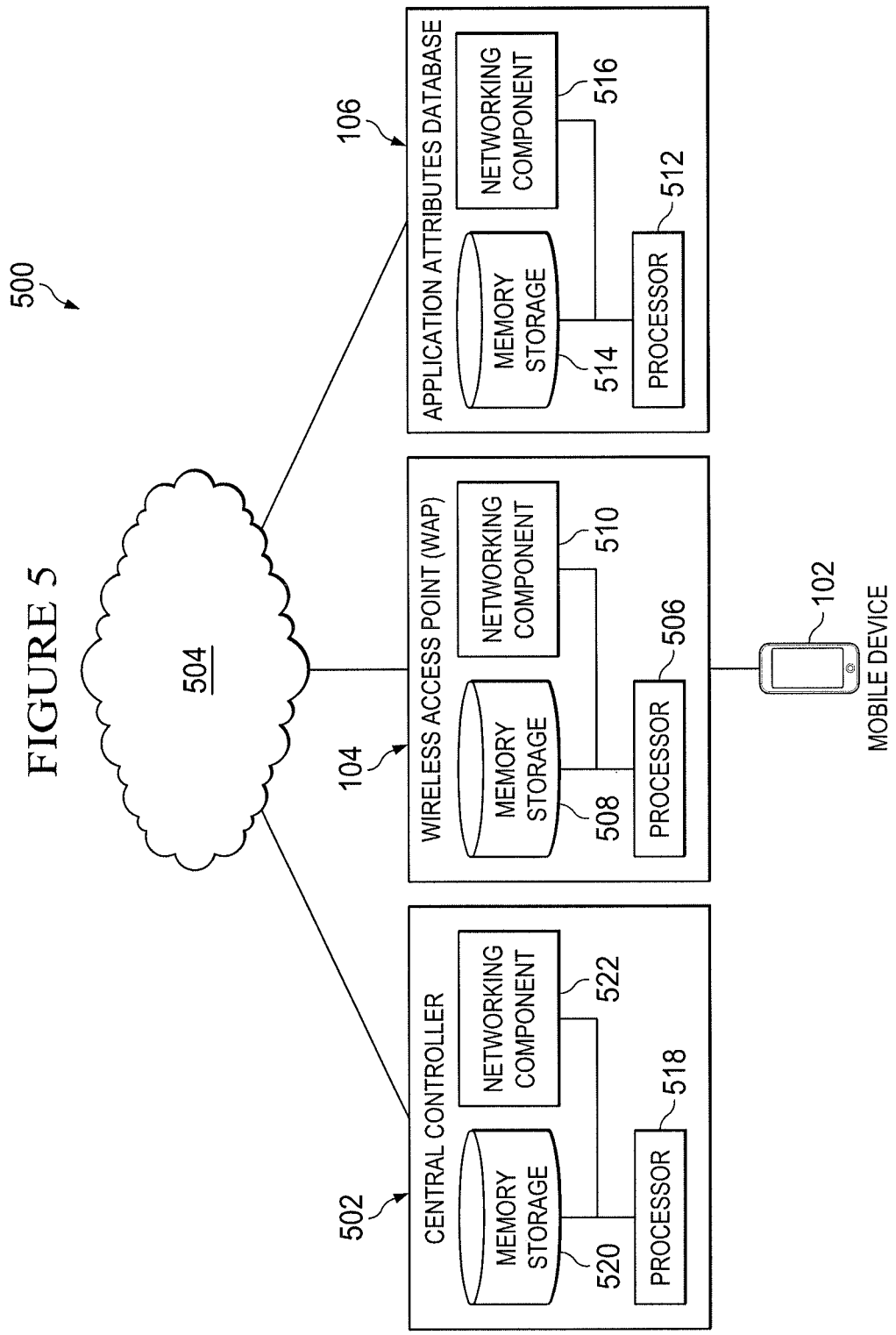

APPLICATION CLASSIFICATION AND MANAGEMENT

TECHNICAL FIELD

The present disclosure relates generally to network devices, and more specifically to application classification and management via network devices.

BACKGROUND

Network edge devices such as wireless access points (WAPs) lack sufficient memory storage and processing power to analyze network traffic from numerous mobile devices, which may be associated with an ever expanding number of applications, and to determine and implement appropriate policy actions regarding individual connections within the network traffic. Wireless access points may benefit from offloading some or all of the storage and processing tasks to local and/or cloud-based network devices and systems.

SUMMARY OF THE DISCLOSURE

According to one embodiment, a network edge device comprises a memory storage, a networking component configured to communicate with a mobile device and a database comprising application attributes, and a processor. The processor, in this embodiment, is located within the network edge device and is operable to receive application traffic from the mobile device (the application traffic being associated with an application), classify the application traffic by associating the application traffic with an application ID, and send a query comprising the application ID to the database comprising application attributes. In addition, the processor, in this embodiment, is operable to receive a response, from the database comprising application attributes, comprising one or more application attributes associated with the application, wherein the response is based in part on the application ID, and to enforce a policy based in part on the application attribute.

According to another embodiment, a network device comprises a memory storage, a networking component configured to communicate with a network edge device, and a processor located within the network device. In this embodiment, the processor is operable to receive a query from the network edge device comprising an application ID associated with application traffic, wherein the application traffic is associated with an application and received by the network edge device from a mobile device. Furthermore, the processor in this embodiment is operable to send a response, to the network edge device, comprising one or more application attributes associated with the application, wherein the response is based in part on the application ID.

In accordance with the present disclosure, certain embodiments may provide one or more technical advantages. For example, particular embodiments may allow network edge devices, such as wireless access points, to more effectively discover and identify/classify different types of mobile applications that are installed and running (e.g., accessing the Internet via the WAP) on user mobile devices. In addition, some embodiments may allow WAPs to discover and identify different types of mobile applications dynamically and in real time, or near-real time. Particular embodiments may also allow WAPs to calculate or receive application attributes, such as information regarding threat levels posed by particular applications and to enforce policies on an application-by-application basis, possibly in real time or near-real time. By using other network devices, such as local and/or cloud-based databases and servers, WAPs in certain embodiments may be able to identify/classify applications associated with network traffic and implement policies while maintaining relatively small onboard memory storage (or even no permanent memory storage) and minimal processing power. Furthermore, by sending and receiving application information from other network devices, WAPs may be able to obtain updated and more relevant policies from the other network devices.

Furthermore, by receiving application information from a WAP, other network devices may be able to analyze and update their application attributes and policies associated with certain applications, in some embodiments. This benefit may be magnified via a crowd-sourcing effect when network devices (such as centralized servers and databases) connect with or indirectly receive information from numerous WAPs according to this disclosure. In certain embodiments, local (or certain cloud-based) databases of application attributes may be able to be updated and synchronized with centralized (or certain other cloud-based) stores of application attributes, thus expanding the capacity of certain network devices to assist with application classification and management at any particular WAP without requiring storage of all known application attributes and other information. In addition, certain embodiments allow centralized network devices to obtain information about applications and network traffic, which can be displayed to a user and/or used to create new policies or policy updates, which can in turn be passed to certain network edge devices, such as WAPs. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 5 illustrates an example system showing example components of certain elements of FIG. 2, e.g., the mobile device, WAP, application attribute database, and central controller.

DETAILED DESCRIPTION OF THE DISCLOSURE

Wireless access points (WAPs) may benefit from offloading some or all of the storage and processing tasks to local and/or cloud-based network devices and systems. For example, by using other network devices to help classify applications associated with network traffic, obtain application attributes, and/or obtain policy updates, edge network devices such as WAPs may be able to dynamically implement application-specific policies on network traffic from mobile devices connected to such WAPs, even when such WAPs have limited memory storage and processing power. In addition, local and cloud-based network devices, including centralized network devices, may be able to obtain information regarding applications and network traffic passing through one or more WAPs. Using this information, such network devices may be able to update, e.g., their application attributes databases and policies and enable a centralized system to more effectively and efficiently manage many network edge devices. In addition, enables more accurate application classification while adapting to changes in the application. Various embodiments of this disclosure may provide some, all, or none of these functions or benefits, or any other functions or benefits readily apparent from this disclosure.

To facilitate a better understanding of the present disclosure, the following provides examples of certain embodiments. The following examples are not to be read to limit or define the scope of the disclosure. Embodiments of the present disclosure and its advantages may be understood by referring to FIGS. 1 through 5, where like numbers are used to indicate like and corresponding parts.

Figure 1:
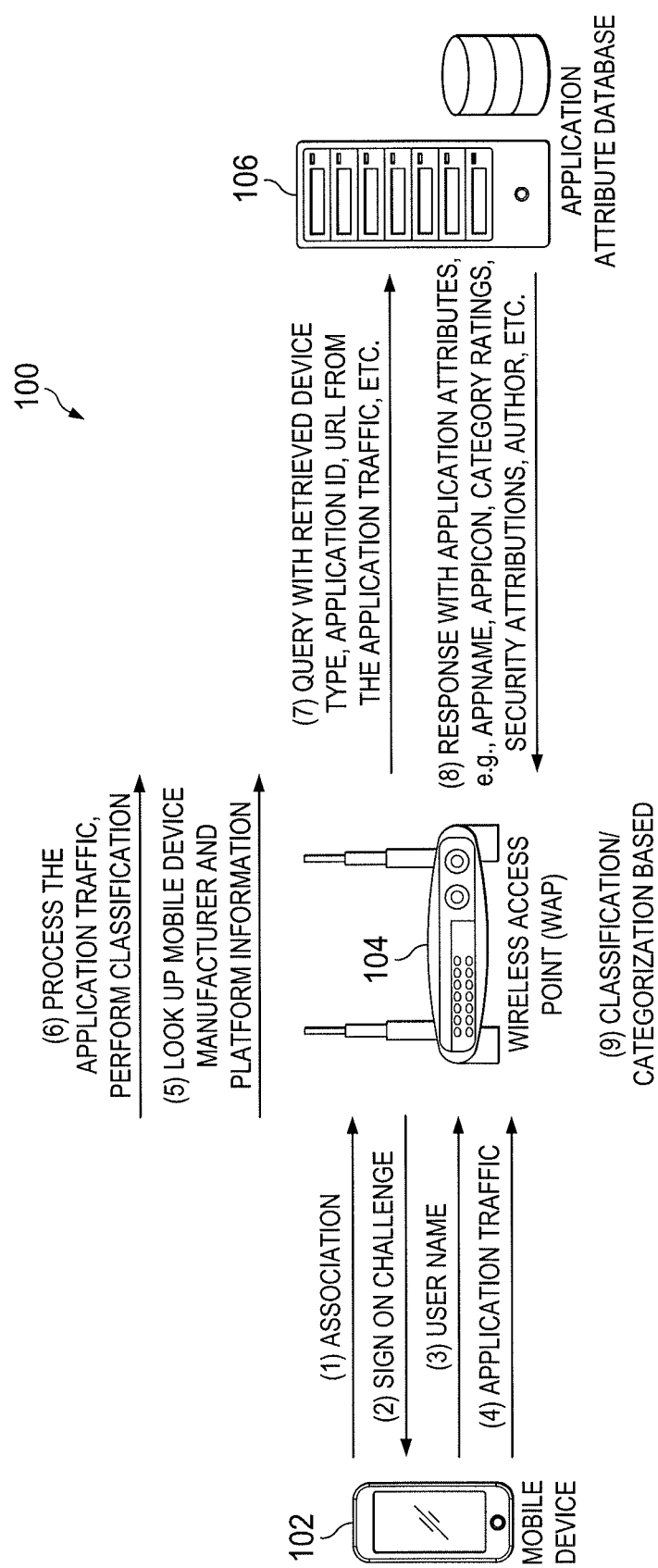
FIG. 1 illustrates an example application classification and management system comprising a mobile device, a WAP, and an application attribute database.

FIG. 1 illustrates an example application classification and management system 100 comprising a mobile device 102, a WAP 104, and an application attribute database 106. In general, WAP 104 processes network traffic from connected mobile device 102 and requests and obtains applications attributes from application attributes database 106. FIG. 1 also illustrates an example step-by-step process describing the operation of system 100, according to a particular embodiment.

Mobile device 102 is a device that connects to a network, such as a network provided or managed by WAP 104, according to some embodiments. For example, mobile device 102 may be a cell phone, tablet, laptop, or any other device that can wirelessly access a network, such as the Internet, a LAN, or any other suitable network. Mobile device 102 may also be able to run one or more applications and may be able to send or receive data/network/application traffic associated with the one or more application over a network connection. In certain embodiments, mobile device 102 may send network traffic associated with an application over a network connection managed by WAN 104.

WAP 104 is an example network edge device, and is generally a device that sits on the edge of a network and provides network connectivity to one or more devices, in some embodiments. For example, WAP 104 is a network edge device that provides wireless connectivity to devices, such as mobile device 102. In certain embodiments, WAP 104 can be any suitable network edge device. Additionally, WAP 104 may connect to other network devices, such as application attribute database 106, in certain embodiments. WAP 104 may also process network traffic, such as application traffic, associate application traffic with particular mobile devices 102 and platform information (e.g., OS type and/or version), classify/categorize certain network connections (e.g., application traffic), and/or enforce quality of service (QoS) policies or other policies. In some embodiments, enforcing a policy may include WAP 104 generating and sending a warning message to mobile device 102 or a user of mobile device 102 (e.g., directly or through a mobile service provider/operator), if WAP 104 identifies malicious or suspicious activity or applications on mobile device 102. This warning message may be in the form of an SMS text message, an email to a user-registered email account, or any other suitable mechanisms (e.g., emergency alert systems for certain cell phones). Additional portions of this disclosure describe in more detail additional example operations of WAP 104.

Application attribute database 106 is a database that contains information regarding applications, for example, application attributes and is an example network device. Application attribute database 106 may allow WAP 104 (and a central controller or other network devices, discussed elsewhere in this disclosure) to query and retrieve certain application attributes upon receipt of information regarding an application, e.g., an identification of a mobile application (application ID). For example, WAP 104 may send a query to application attribute database 106, and application attribute database 106 may respond with one or more application attributes. Application attribute database 106 may be any suitable network device, for example, a computer, server, database, gateway, etc. Application attribute database may be local (e.g., on the same premises as WAP 104), remote, and/or in the cloud (cloud-based).

Application attributes (e.g., those stored in application attribute database 106), characterize certain features and properties of an application associated with network traffic, in certain embodiments. In certain embodiments, if a device (e.g., WAP 104) is processing network application traffic and has access to certain application attributes associated with the application traffic, the device may be able to better manage application traffic and enforce applicable policies. Application attributes may include, for example, a name and version of an application, an icon associated with an application, a platform type the application is running on (e.g., a specific OS), author information of the application, the security attributions (e.g., a threat level, vulnerability of the application to viruses, hacking, etc.), etc.

In addition to describing the components of system 100, FIG. 1 illustrates an example embodiment of how system 100 may operate. In this example, at step (1), mobile device 102 associates with WAP 104. At step (2), WAP 104 accepts the association and sends mobile device 102 a sign on challenge (e.g., a request for a user name, password, etc.). At step (3), mobile device 102 signs on with, e.g., a user name and WAP 104 authenticates mobile device 102 and/or a user of mobile device 102. At step (4), mobile device 102 begins using an application and transmitting application traffic (network traffic associated with an application) to WAP 104.

At step (5), WAP 104 receives the application traffic, including, e.g., individual packets, and looks up the type of mobile device 102 (e.g., a particular smartphone model) and/or platform information (e.g., a particular name or version of an OS running on mobile device 102 and associated with the application traffic). For example, WAP 104 may save a source MAC address of a packet from the application traffic and look up the manufacturer of mobile device 102 using a manufacturing ID in the MAC address. Additionally, in certain embodiments, WAP 104 may look up platform type (e.g., a specific OS) and device type (e.g., smartphone X) using, e.g., the MAC address. In some embodiments, WAP 104 may identify a user of mobile device 102. At step (6), WAP 104 processes the application traffic generated by the application on mobile device 102 and classifies the application traffic based on an application signature, a set of rules, and/or other information obtained or determined during step (5). In certain embodiments, the WAP 104's classification of the application traffic generates a classification result that associates the application traffic with an data related to the application, such as an application ID, a particular application name, etc. In some embodiments, the classification result is presented as an application ID and WAP 104 may not, on its own, be able to identify a particular application name or other application-specific data associated with the application traffic.

At step (7), WAP 104 sends a query to application attribute database 106 containing, e.g., the application ID or any other classification result, device information (e.g., the device type and the platform type), a URL associated with the application traffic, etc. In certain embodiments, the query is in JSON format and may use a using RESTful API. At step (8), application attribute database 106 sends a response to WAP 104 containing application attributes, e.g., application name, application icon, application category and/or category rating, application ratings, application author information, application security attributions (e.g., a threat level, risk factor, vulnerability of the application to viruses, hacking, etc.), etc. In certain embodiments, the response is in JSON format.

At step (9), WAP 104 classifies/categorizes the application traffic, which may include updating the classification result of step (6) based on information retrieved from the response of step (8) and/or creating a new classification result. At step (10) WAP 104 enforces policies, such as QoS polices, on the application traffic based at least in part on one or more application attributes obtained in step (8).

While the example of FIG. 1 shows certain example steps occurring in a particular order, some, none, or all of these steps (and other or modified steps) may occur in certain embodiments in any suitable order. In addition, while FIG. 1 shows certain devices in a particular configuration, this disclosure contemplates some of all of the shown devices (or other devices) in other suitable configurations. In addition, the devices of FIG. 1 may be on the same or different networks.

Figure 2:
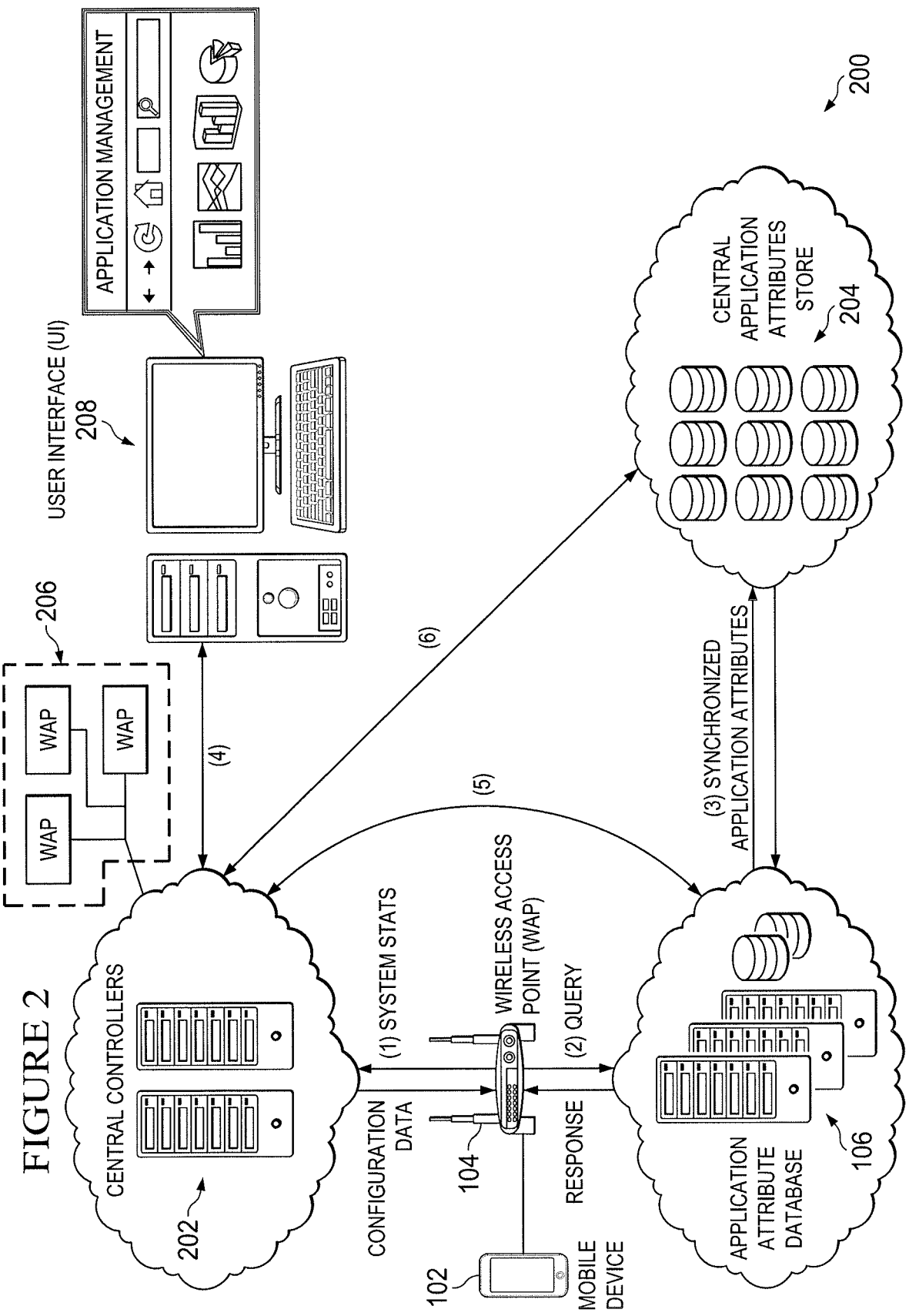
FIG. 2 illustrates an example application classification and management system comprising the components of FIG. 1, as well as additional network devices, e.g., a central controller and a central application attributes store.

FIG. 1 shows a portion of a larger system, an embodiment of which is described in FIG. 2. FIG. 2 illustrates an example application classification and management system 200 comprising the components of FIG. 1, as well as additional network devices, e.g., a central controller 202 and a central application attributes store 204. FIG. 2 also illustrates an example operation of system 100, according to a particular embodiment. In general, system 200 operates to classify and manage application connections, e.g., from mobile devices like mobile device 102. FIG. 2 shows mobile device 102 connected to WAP 104, which is connected to application attribute database 106 and central controller 202. FIG. 2 further shows central application attributes store 204 connected to application attribute database 106 and central controller 202. In addition, central controller 202 is shown as connected with WAP 104, application attribute database 106, central application attributes store 204, other WAPs 206, and as connecting to or having user interface 208.

Mobile device 102 is shown as connected to WAP 104 in this embodiment. Mobile device 102 may have the form and function as described elsewhere in this disclosure (e.g., as described in relation to FIGS. 1, 3, 4, and 5). In addition, other mobile devices, not shown, may function similarly to mobile device 102 and may connect to WAP 104 and/or other WAPs 206. Mobile device 102, in some embodiments, transmits application traffic via network connections over network edge devices, such as WAP 104.

WAP 104 is shown as connected to mobile device 102 and network 504 in this embodiment. WAP 104 may have the form and function as described elsewhere in this disclosure (e.g., as described in relation to FIGS. 1, 3, 4, and 5). In addition, WAP 104 may connect to central controller 202. In certain embodiments, WAP 104 may register with central controller 202 and send system data (e.g., system stats and other information regarding WAP 104, such as application connection information, policy information, etc., and/or information regarding other devices connected to WAP 104). In some embodiments, WAP 104 may receive configuration data (e.g., data used to configure WAP 104, such as how to handle certain connections, information regarding policies, such as new, updated, or removed QoS policies, certain application attributes, lists of blocked or restricted devices, or any other configuration data) from central controller 202.

Application attribute database 106 is shown as connected to WAP 104, central controller 202, and central application attributes store 204. Application attribute database 106 have the form and function as described elsewhere in this disclosure (e.g., as described in relation to FIGS. 1, 3, 4, and 5). In addition, application attribute database 106 may synchronize (send, receive, or both) application attributes with central application attributes store 204, in some embodiments. For example, application attribute database 106 may have a subset of the total available application attributes, many or all of which may be stored in central application attributes store 204. Thus, in certain embodiments, application attribute database 106 may seek application attributes from central application attributes store 204 (e.g., as part of an update, in response to a query from WAP 104, or for any other suitable reason). Furthermore, in particular embodiments, application attribute database 106 may update central application attributes store 204 with application attributes and/or classification results (e.g., sent in, or determined based on, a query from WAP 104 or for any other suitable reason).

In certain embodiments, application attribute database 106 may be associated with particular WAPs, such as WAP 104 and/or may be a application attribute database 106 that is local to a particular user or group, a cloud-based database associated with a particular user or group, or otherwise associated with a particular user or group. In addition, in some embodiments, whether synchronization may occur between application attribute database 106 and central application attributes store 204 is based in part on a subscription application attribute database 106 has to some or all of the information contained in central application attributes store 204. As one example, a user or group may have access to application attribute database 106 and have a subscription to central application attributes store 204 for certain applications or categories of applications. In this example, application attribute database 106 would only be updated with application attributes associated with the subscription.

Central application attributes store 204 is shown as connected to application attribute database 106 and central controller 202. In general, central application attributes store 204 stores application attributes, and, in certain embodiments, contains a large and/or common store of application attributes that many network devices can access. For example, application attribute database 106 may synchronize with central application attributes store 204 regarding application traffic over WAP 104. In addition, other application attribute databases (not shown) associated with other WAPs 206 may connect with and synchronize application attributes with central application attributes store 204. Thus, in particular embodiments, central application attributes store 204 may act as a crowd sourcing repository of application attributes for and/or from multiple WAPs and/or application attribute databases. In certain embodiments, central application attributes store 204 may report statistics and application attributes to central controller 202. As an example, where certain information, such as statistics or particular application attributes, are not available at some or all application attribute databases (e.g., 106), central controller 202 may directly query central application attributes store 204. Central application attributes store 204 may be any suitable network device, for example, a computer, server, database, gateway, etc. Central application attributes store 204 may also comprise a memory storage, a processor, and/or a networking component to store data, process data, and communicate data, respectively, consistent with this disclosure. Application attribute database may be local (e.g., on the same premises as WAP 104), remote, and/or in the cloud (cloud-based).

Central controller 202 is shown as connected to WAP 104, application attribute database 106, central application attributes store 204, other WAPs 206, and user interface 208. In general, central controller 202 manages the operation of some or all of the components of system 200, in some embodiments. Central controller 202 also allows a user to access information associated with system 200 and to manage system 200, e.g., via user interface (UI) 208, in certain embodiments. In particular embodiments, central controller 202 may seek and receive system data from WAP 104. Central controller 202 may also send WAP 104 configuration data (e.g., an initial set of configuration data to provision or otherwise implement an initial set of policies on WAP 104, or a configuration data update) in some embodiments. In one example, central controller 202 may receive information (reports, statistics, etc.) from application attribute database 106 and/or central application attributes store 204 (e.g., a report of a security threat or increased network load from certain applications), and then send updated configuration data comprising a policy or policy update to WAP 104, in response to receiving such information, that affects certain application traffic (e.g., that posed the security threat or increased network load). In certain embodiments, central controller 202 may generate reports for display on UI 208 based, e.g., on information obtained from other elements of system 200. Central controller 202 may be any suitable network device, for example, a computer, server, database, gateway, etc.

Other WAPs 206 are shown as connected to central controller 202. Other WAPs 206 may have the same or similar form and function the same or similar as WAP 104, in certain embodiments, and may be positioned in various locations and on various networks or network segments. FIG. 2 shows other WAPs 206 as an example of how system 200 can accommodate a large number of network devices, such as network edge devices. Other WAPs 206 may be connected to one or more application attribute databases, central application attributes stores, or any other device of system 200.

UI 208 is generally the user interface associated with central controller 202, in some embodiments. In particular embodiments, UI 208 may receive input from a user and may be operable to seek reports and other information regarding system 200 and any component thereof. For example, UI 208 may seek a report of the application traffic currently taking the most bandwidth or causing the most security problems. As another example, UI 208 may be used to distribute and implement certain policies and other configuration data to network edge devices (e.g., WAP 104) or any other device of system 200. UI 208 may be part of central controller 202, a standalone device (e.g., a user's workstation, tablet, or any other suitable device), or any other device of system 200.

In addition to describing the components of system 200, FIG. 2 illustrates an example embodiment of how system 200 may operate to manage application connections. In this example, at step (1) WAP 104 registers with central controller 202 and sends system data (including system stats and its current configuration data) to central controller 202. In response, central controller 202 remotely manages WAP 104 by sending configuration data to WAP 104. In response, WAP may, e.g., modify and/or set certain policies.

At step (2), WAP 104 processes application traffic from mobile device 102 and send a query in real time or near real time to application attribute database 106. The query may contain, e.g., device information (regarding mobile device 102), an application ID associated with the application traffic, and a URL excerpted from the application traffic. In response, application attribute database 106 send a response containing an application name, application icon, application category and/or category rating, application ratings, application author information, application security attributions, etc. The queries and responses may be, e.g., in JSON format using RESTful APIs.

At step (3), application attribute database 106 is local to the deployment of WAP 104 and does not have all application attributes contained in central application attributes store 204. Application attribute database 106 synchronizes application attributes with central application attributes store 204 based on a subscription. The subscription, e.g., licenses application attributes database 106 to a limited number of applications and a set of application attributes associated with each licensed application.

At step (4), a network operator (e.g., a user) accesses UI 208 (e.g., having a rich format user interface) on a web server located in or connected to central controller 202 to manage WAP 104 and/or other WAPs 206 and the associated application policies. Thus, in certain embodiments, instead of logging on to each of WAP 104 and other WAPs 206 individually, the network operator can login to central controller 202, view application classification results from WAPs (e.g., classification results sent from a WAP to an application attributes database or other device), from application attribute databases, or from other devices, set up policies and classification rules regarding certain applications/application traffic, and push the policies and classification rules to one or more WAPs for implementation. In addition, at step (5), UI 208 may also display application attributes associated with particular classification results or applications, e.g., by having central controller 202 communicate with application attribute database 106 to retrieve the sought application attributes using, e.g., RESTful APIs and JSON data format. In another embodiment, at step (6), UI 208 may also display application attributes associated with particular classification results or applications, e.g., by having central controller 202 communicate with central application attributes store 204 to retrieve the sought application attributes using, e.g., RESTful APIs and JSON data format. In an embodiment, step (6) may occur instead of, or in addition to, step (5).

While the above example of the operation of system 200 describes certain example steps occurring in a particular order, some, none, or all of these steps (and other or modified steps) may occur in certain embodiments in any suitable order. In addition, while FIG. 2 shows certain devices in a particular configuration, this disclosure contemplates some of all of the shown devices (or other devices)

in other suitable configurations. In addition, the devices of FIG. 2 may be on the same or different networks.

Figure 3:
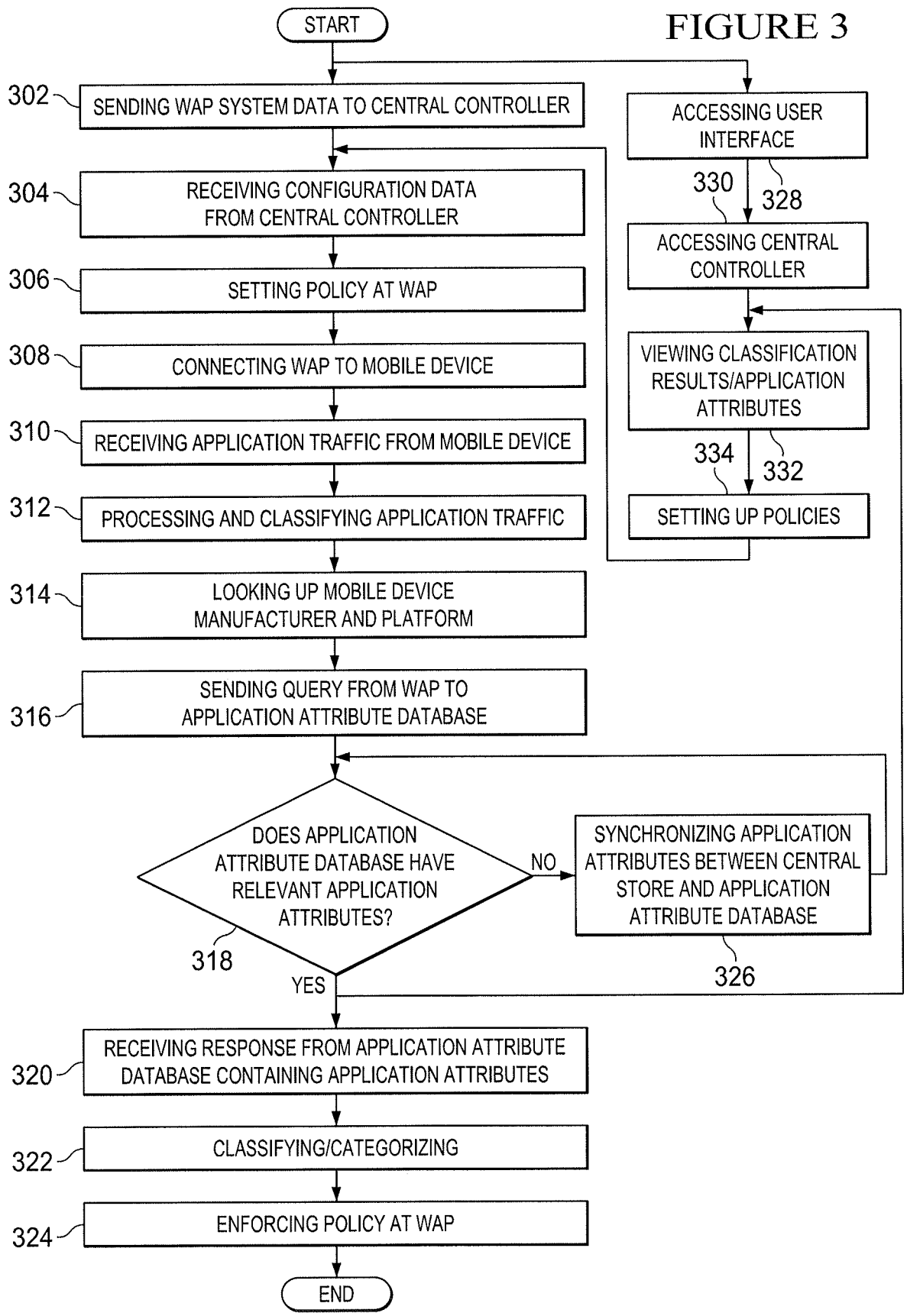
FIG. 3 illustrates a method of application classification and management primarily from the point of view of a network edge device, e.g., as described in FIGS. 1 and 2.

FIG. 3 illustrates a method 300 of application classification and management primarily from the point of view of a network edge device, e.g., as described in FIGS. 1 and 2. Example method 300 contains steps 302 through 334.

Step 302 includes sending WAP (or any network edge device) system data to a central controller. For example, WAP 104 may send system data regarding WAP 104 and/or other network devices to central controller 202.

Step 304 includes receiving configuration data from the central controller. For example, WAP 104 may receive configuration data from central controller 202. Central controller 202 may, in certain embodiments, send configuration data to WAP 104 in response to receiving system data from WAP 104. In particular embodiments, the configuration data may contain policies or updates to policies.

Step 306 includes setting a policy at the WAP. For example, WAP 104 may set a policy regarding application traffic handled by WAP 104. In certain embodiments, WAP 104 may set a policy based at least in part on the configuration information sent by the central controller.

Step 308 includes connecting the WAP to a mobile device. For example, mobile device 102 may connect to WAP 104.

Step 310 includes receiving application traffic from the mobile device. For example, WAP 104 may receive application traffic from mobile device 102.

Step 312 includes processing and classifying the application traffic. For example, WAP 104 may process and/or classify the application traffic sent by or to mobile device 102 and generate a classification result. In certain embodiments, WAP 104 may associate the application traffic with an application ID, e.g., as part of a classification result. In particular embodiments, WAP 104 may be able to classify the application traffic as a type or class of application, and may be able to associate the application traffic with a particular application. WAP 104 may be able to enforce a policy regarding the application traffic in some embodiments. In certain embodiments, WAP 104 may be able to make a complete classification result, it may be able to make a partial classification result, and/or it may seek additional information (e.g., from application attribute database 106) to update or confirm its classification result.

Step 314 includes looking up mobile device manufacturer and platform. For example, WAP 104 may analyze the application traffic (e.g., certain packets) to determine a manufacturer of mobile device 102 and/or the platform the application associated with the application traffic is running on (e.g., a certain OS version or other platform). In certain embodiments, the manufacturer and platform information may be part of the classification result.

Step 316 includes sending a query from the WAP to an application attribute database. For example, WAP 104 may send a query to application attribute database 106 seeking application attributes associated with the application traffic. In certain embodiments, the query may contain any information discussed earlier in method 300, or as described with regard to FIGS. 1 and 2. In a particular embodiment, WAP 104 may send a query to application attribute database 106 containing an application ID associated with the application traffic. In a particular embodiment, WAP 104 may send a query to application attribute database 106 containing the classification result. In certain embodiments, the query may contain application attributes collected and/or determined by WAP 104, e.g., associated with the application connection.

Step 318 includes determining whether the application attribute database has relevant application attributes. In certain embodiments, this step may include determining an application associated with information in the query from WAP 104, for example, the application ID or other information. Thus, in such embodiments, the application may be associated with the application traffic. The application attribute database may, in some embodiments, associate the application with certain application attributes (which may therefore be relevant to the query from WAP 104). In particular embodiments, the application attribute database may associate information in the query (e.g., an application ID) with certain application attributes (which may therefore be relevant to the query from WAP) with or without associating the information with an application. If in step 318 it is determined that the application attribute database has the relevant application attributes, method 300 continues to step 320. If, however, in step 318 it is determined that the application attribute database does not have any, some, or all of the relevant application attributes, method 300 may continue to step 326.

Step 320 includes receiving a response from the application attribute database containing one or more application attributes. For example, WAP 104 may receive a response from application attribute database 106 to the query, which may contain an application attribute, e.g., associated with the application traffic handled by WAP 104.

Step 322 includes classifying/categorizing the application traffic. For example, WAP 14 may, similar to step 312, process and classify the application traffic, e.g., using the application attribute received in step 320. In certain embodiments, this classifying/categorizing step may include updating the classification result discussed in step 312 (e.g., based on the response of step 320) or generating a new classification result. While not shown in FIG. 3, WAP 104 may send the updated and/or new classification result to other network devices, such as application attribute database 106 and/or central controller 202.

Step 324 includes enforcing a policy at the WAP. For example, WAP 104 may enforce a policy regarding the application traffic (or regarding similar application traffic, e.g., of a related application or category of applications). In certain embodiments, WAP 104 may enforce the policy based at least in part on the application attribute contained in the response of step 320, and/or on the updated or new classification result of step 122 (which may itself be based on the application attribute contained in the response of step 320). In some embodiments, enforcing a policy may include WAP 104 generating and sending a warning message to mobile device 102 or a user of mobile device 102 (e.g., directly or through a mobile service provider/operator), if WAP 104 identifies malicious or suspicious activity or applications on mobile device 102. This warning message may be in the form of an SMS text message, an email to a user-registered email account, or any other suitable mechanisms (e.g., emergency alert systems for certain cell phones). Examples of policies may include QoS policies, blocking or reducing/increasing bandwidth of particular mobile devices and/or user of mobile devices, rate control policies, a set of rules (e.g., firewall rules), or any other suitable policy.

Step 326 includes synchronizing application attributes between a central store of application attributes and the application attributes database. For example, application attributes database 106 may synchronize certain application attributes with central application attributes store 204 as described elsewhere in this disclosure. In certain embodiments, application attributes database 106 and central application attributes store 202 may synchronize to send application attributes database 106 certain application attributes regarding the application determined in step 318 and/or the application ID sent in step 316. In certain embodiments, application attributes database 106 may send application attributes obtained from WAP 104 in step 316 to central application attributes store 204, which may serve to update central application attributes store 204 with new application attributes or other application information. In particular embodiments, once the application attributes database synchronizes with the central store, method 300 may continue to step 318.

In some embodiments, if, after synchronization, the application attributes database 106 still does not contain requested or required information, then WAP 104 may (1) provide processed application information to central controller 202, (2) estimate application information (e.g. application attributes) based on, for example, heuristics, and/or (3) perform application classification or update a prior application classification (e.g., in real-time or near-real-time) based on the estimated application information.

Step 328 includes accessing a user interface. In certain embodiments, this may be the first step of method 300, though step 328 may occur at any suitable time. For example a user or network operator may access user interface 208 that is associated with central controller 202.

Step 330 includes accessing a central controller. For example, the user or network operator accesses central controller 202 via user interface 208.

Step 332 includes viewing application classification results and/or application attributes. For example, central controller 202 may cause UI 208 to display certain classification results and/or application results from WAP 104 and/or application attribute database 106. In particular embodiments, classification results and/or application attributes from steps 312 and/or 322 are sent to application attribute database 106, and central controller 202 requests and receives the classification results and/or application attributes from application attributes database 106. In some embodiment, central controller 202 requests and receives the classification results and/or application attributes from WAP 104.

Step 334 includes setting up policies. For example, based on the classification results and/or application attributes received in step 332, central controller 202 may (e.g., at the command of a user/network operator of UI 208) determine a policy to enforce at one or more WAPs (e.g., WAP 104). Method 300 may continue at step 304, where, e.g., central controller 202 sends and WAP 104 receives the policy as, e.g., configuration data.

Although this disclosure describes and illustrates particular steps of the method of FIG. 3 as occurring in a particular order, this disclosure contemplates any steps of the method of FIG. 3 occurring in any order. An embodiment can repeat or omit one or more steps of the method of FIG. 3. In an embodiment, some or all of the steps of the method of FIG. 3 can include or replace some or all of the steps of the method of FIG. 4. In an embodiment, some or all of the steps of the method of FIG. 4 can include or replace some or all of the steps of the method of FIG. 3. Moreover, although this disclosure describes and illustrates particular components carrying out particular steps of the method of FIG. 3, this disclosure contemplates any combination of any components carrying out any steps of the method of FIG. 3.

Figure 4:
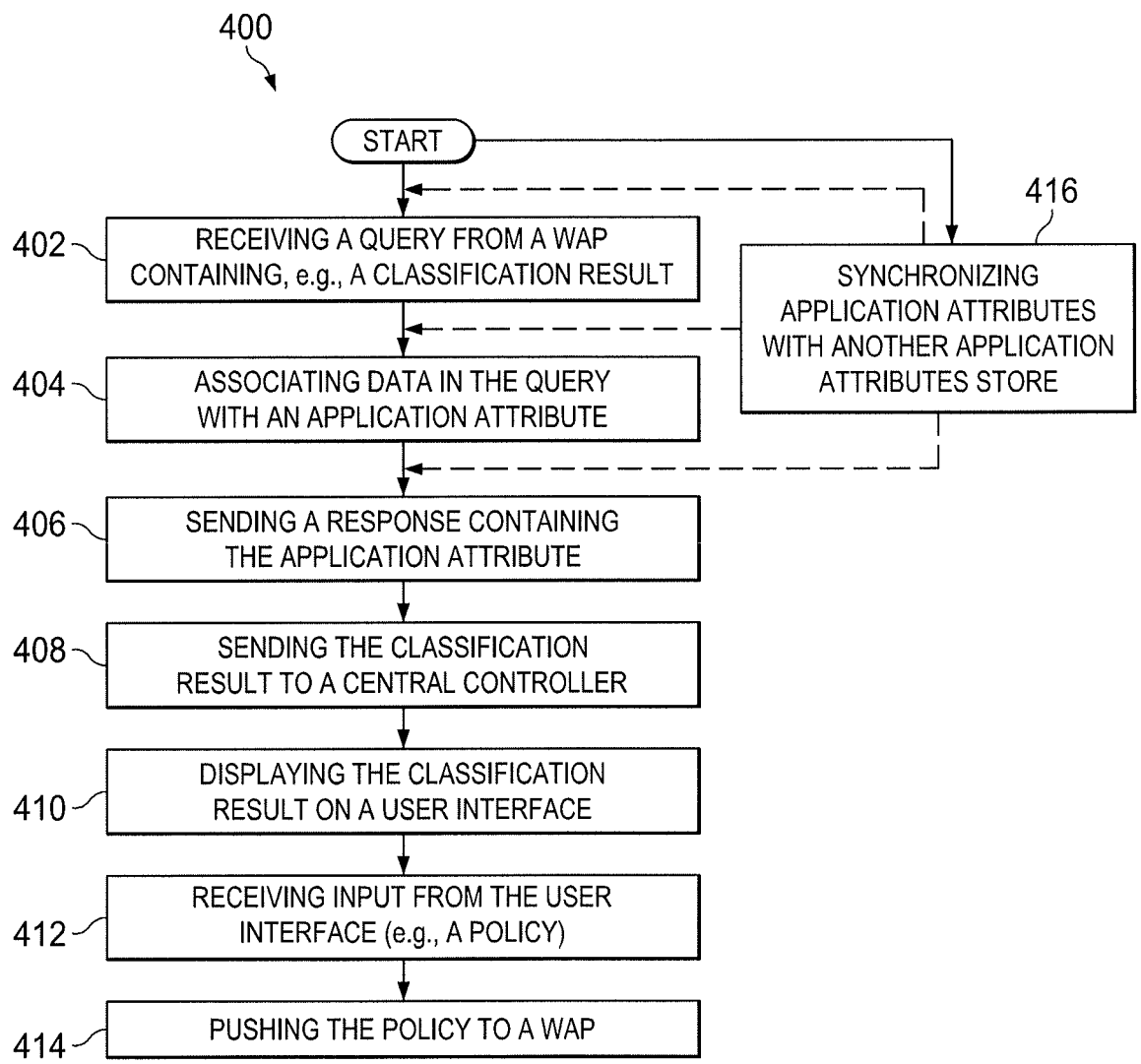
FIG. 4 illustrates another method of application classification and management primarily from the point of view of network devices other than a network edge device, e.g., as described in FIGS. 1 and 2.

FIG. 4 illustrates another method 400 of application classification and management primarily from the point of view of network devices other than a network edge device, e.g., as described in FIGS. 1 and 2. Certain steps of method 400 may be the same as or similar to certain steps of method 300 of FIG. 3. Example method 400 contains steps 402 through 416.

Step 402 includes receiving a query from a WAP containing, for example, a classification result. For example, a network device such as application attribute database 106 or central controller 202 may receive a query or other message from WAP 104 containing information/data including a classification result (having, e.g., and application ID).

Step 404 includes associating data in the query with an application attribute. For example, application attribute database 106 may associate an application ID (or another portion of, e.g., the classification result) in the query with an application attribute and/or an application.

Step 406 includes sending a response containing the application attribute. For example, application attribute database 106 may send a response to WAP 104 containing the application attribute of step 404.

Step 408 includes sending the classification result to a central controller. For example, application attribute database 106 may send the classification result from WAP 104 to central controller 202.

Step 410 includes displaying the classification result on a user interface. For example, central controller 202 may cause the classification result to display on UI 208.

Step 412 includes receiving input from the user interface. For example, a user using UI 208 may create or edit a policy based at least in part on the classification result, and central controller 202 may receive the policy. In certain embodiment, central controller 202 may create or edit a policy based on rules sets or other information with or without input from a user or UI 208. For example, central controller 202 may create or edit a policy based on a rules set and the classification result.

Step 414 includes pushing the policy to a WAP. For example, central controller 202 pay push the policy determined in step 412 to WAP 104, which WAP 104 may implement and use to manage network traffic associated with certain applications (e.g., the application or application class associated with the classification result). In certain embodiments, central controller 202 may send the policy to multiple WAPs, for example, WAP 104 and/or any or all other WAPs 206.

Step 416 includes synchronizing application attributes with another application attributes store. For example, application attribute database 106 may synchronize application attributes with central application attributes store 204, as described elsewhere in this disclosure. In certain embodiments, step 416 may occur at any point in method 400, for example, before step 402, 404, 406, or any other suitable step.

Although this disclosure describes and illustrates particular steps of the method of FIG. 4 as occurring in a particular order, this disclosure contemplates any steps of the method of FIG. 4 occurring in any order. An embodiment can repeat or omit one or more steps of the method of FIG. 4. In an embodiment, some or all of the steps of the method of FIG. 4 can include or replace some or all of the steps of the method of FIG. 3. In an embodiment, some or all of the steps of the method of FIG. 3 can include or replace some or all of the steps of the method of FIG. 4. Moreover, although this disclosure describes and illustrates particular components carrying out particular steps of the method of FIG. 4, this disclosure contemplates any combination of any components carrying out any steps of the method of FIG. 4.

FIG. 5 illustrates an example system 500 showing example components of certain elements of FIG. 2, e.g., mobile device 102, WAP 104, application attribute database 106, and central controller 202. In certain embodiments, some or all of WAP 104, application attribute database 106, and central controller 202 may be connected directly with one another or via a network 504. In general, each of mobile device 102, WAP 104, application attribute database 106, and central controller 202 operate as described in this disclosure.

Network 504 connects certain elements of this disclosure, in some embodiments. Network 504 may be any local or wide area network that is suitable for use in or with this disclosure, for example: the Internet, a local area network, a private network, a cellular network, etc.

Mobile device 102 is shown as connected to WAP 104 in this embodiment. Mobile device 102 may function as described elsewhere in this disclosure.

WAP 104 is shown as connected to mobile device 102 and network 504 in this embodiment. WAP 104 may function as described elsewhere in this disclosure. In addition, WAP 104 may contain certain components, such as a processor 506, a memory storage 508, and a networking component 510. In general, processor 506 performs operations and processes data in WAP 104 and is any device suitable for such purposes. In certain embodiments, processor 506 may help perform any and all functions of WAP 104 as described in this disclosure. In general, memory storage 508 stores data in WAP 104. In certain embodiments, memory storage 508 may not be permanent storage, but rather temporary storage, such as a data cache (though memory storage 508 may be any suitable type of storage, including permanent storage, cloud storage, etc.). In some embodiments, memory storage 508 stores some or all of the data used by WAP 104 to operate as described in this disclosure. In general, networking component 510 allows WAP 104 to communicate with other devices over network connections, for example network 504, mobile device 102, application attribute database 106, etc.

In an example embodiment, WAP 104 is a WiFi hotspot and may have a small form factor that provides WiFi, cellular, and/or other wireless connectivity, mobile application visibility, and control capabilities. WAP 104 may, for example, have multiple antennas (as part of networking component 510) that can be configured at, e.g., 2.4 GHz or 5 GHz and are compatible with various wireless networking standards, such as IEEE 802.11a/b/g/n/ac. WAP 104 may, for example, have one or more antennas that are compatible with 3G, 4G, LTE, and other cellular network standards. In certain embodiments, WAP 104 can operate as a wireless gateway for mobile device 102. Upstream connectivity can be provided, for example, through Ethernet cable or cellular wireless network, and WAP 104 may be able to process traffic from any and all antennas simultaneously.

Application attribute database 106 is shown as connected to network 504 in this embodiment. Application attribute database 106 may function as described elsewhere in this disclosure. In addition, application attribute database 106 may contain certain components, such as a processor 512, a memory storage 514, and a networking component 516. In general, processor 512 performs operations and processes data in Application attribute database 106 and is any device suitable for such purposes. In certain embodiments, processor 512 may help perform any and all functions of application attribute database 106 as described in this disclosure. In general, memory storage 514 stores data in application attribute database 106. In certain embodiments, memory storage 514 may provide database storage and may be any suitable type of storage, including permanent storage, cloud storage, temporary storage, etc.). In some embodiments, memory storage 514 stores some or all of the data used by application attribute database 106 to operate as described in this disclosure. In general, networking component 516 allows application attribute database 106 to communicate with other devices over network connections, for example network 504, WAP 104, central controller 202, etc.

Central controller 202 is shown as connected to network 504 in this embodiment. Central controller 202 may function as described elsewhere in this disclosure. In addition, central controller 202 may contain certain components, such as a processor 518, a memory storage 520, and a networking component 522. In general, processor 518 performs operations and processes data in central controller 202 and is any device suitable for such purposes. In certain embodiments, processor 518 may help perform any and all functions of central controller 202 as described in this disclosure. In general, memory storage 520 stores data in central controller 202. In certain embodiments, memory storage 520 may not be permanent storage, but rather temporary storage, such as a data cache (though memory storage 520 may be any suitable type of storage, including permanent storage, cloud storage, etc.). In some embodiments, memory storage 520 stores some or all of the data used by central controller 202 to operate as described in this disclosure. In general, networking component 522 allows central controller 202 to communicate with other devices over network connections, for example network 504, WAP 104, application attribute database 106, other WAPs (not shown, see, e.g., FIG. 2), etc.

While certain components of certain devices are shown in FIG. 5 in certain configurations, other suitable components, devices, and configurations are contemplated in this disclosure.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A network edge device, comprising:
a memory storage;
a networking component configured to communicate with a mobile device and a database comprising application attributes; and
a processor operable to:
receive application traffic from the mobile device, the application traffic being associated with an application;
classify the application traffic by associating the application traffic with an application ID;
determine mobile device data, the mobile device data comprising at least one of a manufacturer associated with the mobile device, a type of mobile device associated with the mobile device, a platform associated with the mobile device, and a URL associated with the application traffic;
send a query comprising the application ID and the mobile device data to the database comprising application attributes;
receive a response from the database comprising application attributes, the response including a security-related attribute associated with the application, wherein the security-related attribute identifies a threat level of the application or a risk factor of the application or a vulnerability of the application to viruses, and wherein the response is based in part on the application ID and the mobile device data;
update the classification of the application based on the security-related attribute, wherein the updated classification identifies the application as malicious; and
enforce a policy based in part on the updated classification of the application, wherein the policy includes blocking the mobile device from receiving data from the application.

2. The network edge device of claim 1, wherein:
the networking component is further configured to communicate with a central controller; and
the processor is further operable to:
send system data of the network edge device to a central controller; and
receive configuration data from the central controller.

3. The network edge device of claim 2, wherein the processor is further operable to set a second policy based on the configuration data.

4. A network device, comprising:
a memory storage;
a networking component configured to communicate with a network edge device; and
a processor operable to:
receive a query from the network edge device comprising an application ID associated with application traffic and mobile device data, wherein:
the application traffic is associated with an application;
the application traffic is received by the network edge device from a mobile device; and
the mobile device data comprises at least one of a manufacturer associated with the mobile device, a type of mobile device associated with the mobile device, a platform associated with the mobile device, and a URL associated with the application traffic;
send a response to the network edge device, the response including a security-related attribute associated with the application that identifies a threat level of the application or a risk factor of the application or a vulnerability of the application to viruses, wherein the response is:
based in part on the application ID and the mobile device data; and
configured to assist the network edge device identify the application as malicious and enforce a policy that includes blocking the mobile device from receiving data from the application.

5. The network device of claim 4, wherein:
the networking component is further configured to communicate with a central controller; and
the processor is further operable to:
receive a request from the central controller for data associated with the network edge device;
send data associated with the network edge device to the central controller.

6. A method, comprising:
receiving, at a network edge device, application traffic from a mobile device, the application traffic being associated with an application;
classifying, by the network edge device, the application traffic by associating the application traffic with an application ID;
determining, by the network edge device, mobile device data, the mobile device data comprising at least one of a manufacturer associated with the mobile device, a type of mobile device associated with the mobile device, a platform associated with the mobile device, and a URL associated with the application traffic;
sending a query comprising the application ID and the mobile device data from the network edge device to a database comprising application attributes;
receiving a response at the network edge device from the database comprising application attributes, the response including a security-related attribute associated with the application, wherein the security-related attribute identifies a threat level of the application or a risk factor of the application or a vulnerability of the application to viruses, and wherein the response is based in part on the application ID and the mobile device data;
updating, by the network edge device, the classification of the application based on the security-related attribute, wherein the updated classification identifies the application as malicious; and
enforcing a policy based in part on the updated classification of the application, wherein the policy includes blocking, by the network edge device, the mobile device from receiving data from the application.

7. The method of claim 6, further comprising:
sending system data of the network edge device to a central controller;

receiving configuration data from the central controller; and setting a second policy based on the configuration data.

8. The network edge device of claim 1, wherein the mobile device is blocked from receiving any bandwidth from the network edge device.

9. The network device of claim 4, wherein the mobile device is blocked from receiving any bandwidth from the network edge device.

10. The method of claim 6, wherein the mobile device is blocked from receiving any bandwidth from the network edge device.

11. The network edge device of claim 1, wherein the response from the database further includes information regarding the author of the application.

12. The network edge device of claim 1, wherein the response from the database further includes a name of the application and an icon associated with the application.

13. The network device of claim 4, wherein the response to the network edge device further includes information regarding the author of the application.

14. The network edge device of claim 1, wherein the response to the network edge device further includes a name of the application and an icon associated with the application.

15. The method of claim 6, wherein the response from the database further includes information regarding the author of the application.

16. The network edge device of claim 6, wherein the response from the database further includes a name of the application and an icon associated with the application.

* * * * *